(12) United States Patent
Kamikawa et al.

(10) Patent No.: US 8,313,244 B2
(45) Date of Patent: Nov. 20, 2012

(54) WHEEL BEARING ASSEMBLY, MANUFACTURING METHOD THEREFOR, AND CALK JIG

(75) Inventors: Tsuyoshi Kamikawa, Nara (JP); Kentaro Shirakami, Osaka (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 678 days.

(21) Appl. No.: 12/385,084

(22) Filed: Mar. 30, 2009

(65) Prior Publication Data

US 2009/0261647 A1 Oct. 22, 2009

(30) Foreign Application Priority Data

Mar. 28, 2008 (JP) ................................. 2008-087094
Mar. 31, 2008 (JP) ................................. 2008-091684

(51) Int. Cl.
*F16C 43/04* (2006.01)
(52) U.S. Cl. ........................................ 384/544; 384/589
(58) Field of Classification Search .................. 384/537, 384/543, 544, 585, 589
See application file for complete search history.

(56) References Cited

U.S. PATENT DOCUMENTS

| | | | |
|---|---|---|---|
| 5,975,765 A | 11/1999 | Kawamura | |
| 6,113,279 A * | 9/2000 | Sawai et al. | 384/537 |
| 6,280,096 B1 * | 8/2001 | Miyazaki et al. | 384/544 |
| 6,692,157 B2 * | 2/2004 | Sahashi et al. | 384/537 |
| 6,722,786 B2 | 4/2004 | Toda et al. | |
| 6,808,312 B1 | 10/2004 | Toda et al. | |
| 6,814,495 B2 * | 11/2004 | Toda et al. | 384/544 |
| 6,832,854 B2 | 12/2004 | Umekawa et al. | |
| 6,921,137 B2 | 7/2005 | Morimoto et al. | |
| 7,290,939 B2 | 11/2007 | Toda et al. | |
| 2002/0025093 A1 * | 2/2002 | Sahashi et al. | 384/544 |
| 2002/0051597 A1 * | 5/2002 | Sera et al. | 384/544 |
| 2003/0185479 A1 * | 10/2003 | Toda et al. | 384/544 |
| 2004/0165804 A1 | 8/2004 | Toda et al. | |
| 2005/0078901 A1 | 4/2005 | Toda et al. | |

FOREIGN PATENT DOCUMENTS

| | | |
|---|---|---|
| EP | 0 854 303 A2 | 7/1998 |
| EP | 1 179 440 A2 | 2/2002 |
| EP | 1 264 998 A2 | 12/2002 |
| EP | 1 312 819 A1 | 5/2003 |
| JP | 4-41026 A | 2/1992 |

(Continued)

OTHER PUBLICATIONS

European Search Report dated Feb. 24, 2010.

(Continued)

*Primary Examiner* — Patrick Mackey
(74) *Attorney, Agent, or Firm* — McGinn IP Law Group, PLLC

(57) ABSTRACT

In a wheel bearing assembly, the length of an annular protrusion in an axis direction, or the oscillation angle through which the center axis of a calk jig is oscillatingly turned relative to the center axis of a constant-velocity joint outer ring is restricted so that the annular protrusion and the calk jig do not interfere with each other when the constant-velocity joint outer ring is calk-fixed to the calk fixation portion of the wheel hub by radially outwardly bending a tubular protrusion formed on an end surface of the center shaft portion through the oscillating turn of the calk jig after the center shaft portion of the constant-velocity joint outer ring has been fitted to the hollow hole of the wheel hub.

7 Claims, 3 Drawing Sheets

FOREIGN PATENT DOCUMENTS

| | | |
|---|---|---|
| JP | 2000-87979 A | 3/2000 |
| JP | 2001-246440 A | 9/2001 |
| JP | 2001-315502 A | 11/2001 |
| JP | 2002-139060 A | 5/2002 |
| JP | 2003-65346 A | 3/2003 |
| JP | 2004-345517 A | 12/2004 |
| JP | 2005-162204 A | 6/2005 |
| JP | 2006-347544 A | 12/2006 |
| JP | 2007-205577 A | 8/2007 |
| JP | 2007-224954 A | 9/2007 |
| JP | 2009-2480 A | 1/2009 |
| WO | WO 02/085552 A1 | 10/2002 |

OTHER PUBLICATIONS

Notification of Reasons for Refusal dated Apr. 2, 2012 (with a partial English translation).

Japanese Office Action dated Aug. 28, 2012 with a partial English translation thereof.

\* cited by examiner

WHEEL BEARING ASSEMBLY, MANUFACTURING METHOD THEREFOR, AND CALK JIG

INCORPORATION BY REFERENCE

The disclosure of Japanese Patent Application No. 2008-087094 filed on Mar. 28, 2008 and Japanese Patent Application No. 2008-091684 filed on Mar. 31, 2008 including the specification, drawings and abstract is incorporated herein by reference in its entirety.

BACKGROUND OF THE INVENTION

1. Field of the Invention

This invention relates to a wheel bearing assembly, a manufacturing method of the assembly, and a calk jig. Concretely, the invention relates to a wheel bearing assembly that is assembled by using a calking process, and a manufacturing method for the assembly as well as a calk jig for use in the manufacturing method.

2. Description of the Related Art

A wheel bearing assembly includes a wheel hub, a constant-velocity joint outer ring, and a multi-row tolling bearing in which inner ring raceway surfaces are formed on an outer peripheral surface of a wheel hub and an outer peripheral surface of a constant-velocity joint outer ring. In this type of wheel bearing assembly, the wheel hub and the constant-velocity joint outer ring are integrated by fitting a center shaft portion that is formed integrally with the constant-velocity joint outer ring into a hollow hole that is formed in a shaft center portion of the wheel hub. Furthermore, a tubular protrusion formed on a shaft end of the center shaft portion of the constant-velocity joint outer ring is calked and fixed to a calk fixation portion of an outer end surface of the wheel hub by bending it radially outward with a calk jig, and a compression in the axis direction is applied to the tubular protrusion. In this manner, the loosening between the wheel hub and the constant-velocity joint outer ring in the axis direction is substantially prevented.

With reference to FIG. 6, a method of performing a calking processing on a wheel bearing assembly 50 according to a related-art technology will be described. In FIG. 6, in the wheel bearing assembly 50, a center shaft portion 62 formed integrally with a constant-velocity joint outer ring 60 is spline-fitted to a hollow hole 54 of a wheel hub 52, and an outer race 70 of a multi-row rolling bearing is fitted onto the wheel hub 52 and the constant-velocity joint outer ring 60 integrally connected together. A guide hole 66 capable of receiving a cylindrical punch protrusion end 74 that is formed on a distal end of a calk punch 72, that is, a calk jig, is formed inside a tubular protrusion 64 that is formed on an end portion of the center shaft portion 62 of the constant-velocity joint outer ring 60. The tubular protrusion 64 is radially outwardly bent so as to be calk-fixed to a calk fixation portion 57 of an outer end surface 56 of the wheel hub 52 which is adjacent to the hollow hole 54 of the wheel hub 52, by inserting the punch protrusion end 74 of the calk punch 72 into the guide hole 66, and oscillatingly turning the calk punch 72 while pressing the calk punch 72 against the tubular protrusion 64 that is formed on an end portion of the center shaft portion 62 of the constant-velocity joint outer ring 60.

A sectional shape of a calked portion 65 that has been calk-fixed is shown in FIG. 7. In this related-art technology, the calked portion 65 formed on a distal end of the center shaft portion 62 is calk-fixed so that a distal end portion of an outer surface of the calked portion 65 is inclined toward the inner side. A calking angle β that is the angle of the inclination toward the inner side with reference to a radially outward direction from the axis of the center shaft portion 62 in a plane perpendicular to the shaft center as shown in FIG. 7 is set at about 30 degrees.

One related-art literature is Japanese Patent Application Publication No. 2001-246440 (JP-A-2001-246440) (related literature 1). The related literature 1 describes a method in which in a hub unit for a vehicle, an outer side end portion of a center shaft portion formed integrally with a constant-velocity joint outer ring is calked to an outer end surface of a wheel hub by bending the outer side end portion of the center shaft portion in radial directions from the shaft center. In addition, the related literature 1 also describes that in order to prevent deformation of the hub unit during the process of calking, restraint jigs are set on the constant-velocity joint outer ring and its center shaft portion during the calking process (see FIG. 4 in the related literature 1).

Another related-art literature is Japanese Patent Application Publication No. 2001-315502 (JP-A-2001-315502) (related literature 2). The related literature 2 describes, as a manufacturing method for a wheel hub unit for a vehicle, a method in which an end portion of a center shaft portion formed integrally with a constant-velocity joint outer ring is calked to an outer end surface of a wheel hub by bending the end portion of the center shaft portion radially outward (see FIG. 2 in the related literature 2). Although the patent literature 2 does not provide a clear description of the foregoing calking angle, it can be understood that the aforementioned calking angle is set at about 30 degrees, according to the drawings of the related literature 2. In addition, the patent literature 2 also describes that in order to prevent deformation of a hub unit for a vehicle during the process of calking, restraint jigs are set on a constant-velocity joint outer ring during the calking process (see FIG. 2 in the related literature 2).

By the way, as shown in FIG. 6, a tubular annular protrusion 58 that is protruded in the axis direction and that serves as a guide when a wheel-side member is attached is formed at a site radially outwardly of the calk fixation portion 57, on the outer end surface 56 of the wheel hub 52. Therefore, there is a concern that when the calking fixation is performed by oscillatingly turning the calk punch 72, the calk punch 72 may interfere with the annular protrusion 58 of the wheel hub 52, and therefore may deform the annular protrusion 58, depending on the calking position, the size of the calking diameter, or the magnitude of the oscillation angle of the calk punch 72.

SUMMARY OF THE INVENTION

Accordingly, it is an object of the invention to prevent a calk jig from interfering with an annular protrusion of a wheel hub of a wheel bearing assembly when an end portion of a center shaft portion formed integrally with a constant-velocity joint outer ring is calk-fixed to the wheel hub.

One aspect of the invention is a wheel bearing assembly that includes: a wheel hub having a hollow hole formed in a shaft center portion, an annular protrusion provided on an outer end surface, and a calk fixation portion of the outer end surface which is located between the hollow hole and the annular protrusion; and a constant-velocity joint outer ring having a center shaft portion, and a tubular protrusion formed on an end portion of the center shaft portion. A length of the annular protrusion in an axis direction, or an oscillation angle through which a center axis of a calk jig is oscillatingly turned relative to a center axis of the constant-velocity joint outer ring is restricted so that the annular protrusion and the calk jig do not interfere with each other when the constant-velocity joint outer ring is calk-fixed to the calk fixation portion of the wheel hub by bending the tubular protrusion radially outward through oscillating turn of the calk jig after the center shaft portion of the constant-velocity joint outer ring has been fitted to the hollow hole of the wheel hub. According to this aspect of the invention, the interference of the calk jig with the annular protrusion of the wheel hub can be prevented.

In the foregoing construction, the length of the annular protrusion of the wheel hub in the axis direction may be set at such a length that the annular protrusion does not interfere with the calk jig when the calk jig is oscillatingly turned. According to this construction, the oscillation space for the calk punch is secured, so that the interference of the calk punch with the annular protrusion of the wheel hub can be prevented. Besides, since the interference of the calk jig with the annular protrusion of the wheel hub is restrained, the degree of freedom in the design of the shaft or the like increases. For example, the diameter of the center shaft portion formed integrally with the constant-velocity joint outer ring can be increased, and the outside diameter of the calk can be increased, and so on.

Besides, in the wheel bearing assembly in accordance with the foregoing aspect, fitting between the hollow hole of the wheel hub and the center shaft portion of the constant-velocity joint outer ring may be spline fitting, and, a portion of the center shaft portion of the constant-velocity joint outer ring, that is spline-fitted, may have a solid cylindrical configuration. According to this construction, since the fitting between the hollow hole of the wheel hub and the center shaft portion of the constant-velocity joint outer ring is spline fitting, the relative rotation between the two members is restrained. Besides, since, the portion of the center shaft portion of the constant-velocity joint outer ring, that is spline-fitted, is formed in a solid cylindrical shape without an internal cavity or the like. Therefore, the deformation of the center shaft portion of the constant-velocity joint outer ring by the stress that acts on the center shaft portion during the calking processing can be restrained.

Besides, the wheel bearing assembly in accordance with the foregoing construction may further include a cover that is attached to the annular protrusion of the wheel hub and that therefore serves as a guide for guiding a traveling wheel member to the wheel hub, the cover extending further outward in the axis direction from a distal end of the annular protrusion when the cover is attached to the annular protrusion. According to this construction, since the cover extending outward serves as a guide for guiding a traveling wheel member to the wheel hub, the attachment of the traveling wheel member is easy.

Besides, in the foregoing construction of the invention, fitting between the hollow hole of the wheel hub and the center shaft portion of the constant-velocity joint outer ring may be spline fitting, and an outer surface of a calked portion formed by bending the end portion of the center shaft portion of the constant-velocity joint outer ring has a construction in which an inclination angle of the outer surface toward an inner side with respect to a direction radially outward from the center axis of the center shaft portion in a plane that is substantially perpendicular to the center axis may be in a range of −5 degrees to 15 degrees. According to this construction, the outer surface of the calked portion formed on an end portion of the center shaft portion is inclined toward an inner side at an angle ranging from −5 degrees to 15 degrees with respect to a radially outward direction from the center axis of the center shaft portion in a plane perpendicular to the center axis. Thus, the calking angle is smaller than the calking angle according to the related art. Therefore, the angle through which the calk jig is oscillatingly turned can be set smaller than in the related-art technology. Therefore, the oscillation space needed for the calk jig is relatively small, so that the interference of the calk jig with the annular protrusion of the wheel hub can be prevented even when the position of the annular protrusion of the wheel hub and the length thereof in the axis direction are the same as in the related art. Besides, since the force needed for the calking is smaller than in the related art, impressions on surfaces are unlikely to result, and deformation of the wheel hub or the constant-velocity joint outer ring is also unlikely to result.

Besides, in the wheel bearing assembly in accordance with the foregoing construction, the outer surface of the calked portion may include only a flat surface that is perpendicular to the center axis of the center shaft portion. According to this construction, the outer surface of the calked portion is constructed of only a flat surface that is perpendicular to the center axis of the center shaft portion. Since, due to the calked portion having a planar configuration, the pressing surface positioned around the punch protrusion end of the calk jig can have a linear shape with a fixed inclination which extends radially outward from the center axis of the calk jig, the configuration of the calk jig becomes simple. Besides, since the contact of the calk jig with the tubular protrusion of the constant-velocity joint outer ring is a planar contact, the calked portion does not fit into the calk jig, so that good operation efficiency of the calking is achieved.

Besides, in the wheel bearing assembly in accordance with the foregoing construction, the oscillation angle through which the center axis of the calk jig is oscillatingly turned may be less than or equal to 5 degrees relative to the center axis of the center shaft portion of the constant-velocity joint outer ring. According to this construction, since the oscillation angle through which the center axis of the calk jig is oscillatingly turned is less than or equal to 5 degree relative to the center axis of the center shaft portion of the constant-velocity joint outer ring, the oscillation space for the calk jig can be made smaller than in the related art. Hence, even if the position of the annular protrusion of the wheel hub and the length thereof in the axis direction are the same as in the related art, the interference of the calk jig with the annular protrusion of the wheel hub can be prevented.

A manufacturing method for the foregoing wheel bearing assembly in accordance with another aspect of the invention includes: spline-fitting the center shaft portion of the constant-velocity joint outer ring to the hollow hole of the wheel hub; and calk-fixing the constant-velocity joint outer ring to the calk fixation portion of the wheel hub by radially outwardly bending an end surface of the tubular protrusion formed on the end portion of the center shaft portion of the constant-velocity joint outer ring through a use of a calk jig, wherein in the calk-fixing, an oscillation angle through which a center axis of the calk jig is oscillatingly turned is less than or equal to 5 degrees relative to a center axis of the constant-velocity joint outer ring.

In the wheel bearing assembly manufacturing method in accordance with the aspect of the invention, the calk jig used in the calk-fixing may include: a cylindrical calk punch; a punch protrusion end provided on a central portion of a distal end of the calk punch; and a pressing surface that is located around the punch protrusion end and that is made up of only a flat surface.

Besides, in the wheel bearing assembly manufacturing method in accordance with the foregoing construction, the pressing surface may be an inclined flat surface that is inclined radially outward from the punch protrusion end, and an angle formed by the inclined flat surface and the punch protrusion end may be set at an obtuse angle.

Besides, in the wheel bearing assembly manufacturing method in accordance with the foregoing construction, the oscillation angle may be set at an angle equal to an angle that is formed by the inclined flat surface of the calk punch and a reference plane that is perpendicular to the center axis of the calk punch is provided at a point in the inclined flat surface which is closest to the punch protrusion end, when the calk fixing is performed.

Besides, a calk jig for use for the wheel bearing assembly in accordance with still another aspect of the invention includes: a cylindrical calk punch; a punch protrusion end provided on a central portion of a distal end of the calk punch; and a pressing surface that is located around the punch protrusion end, and that is formed of only a flat surface.

In the calk jig in accordance with the foregoing construction, the pressing surface of the calk punch may be an inclined flat surface that is inclined radially outward from the punch protrusion end, and an angle formed by the inclined flat surface and the punch protrusion end may be set at an obtuse angle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
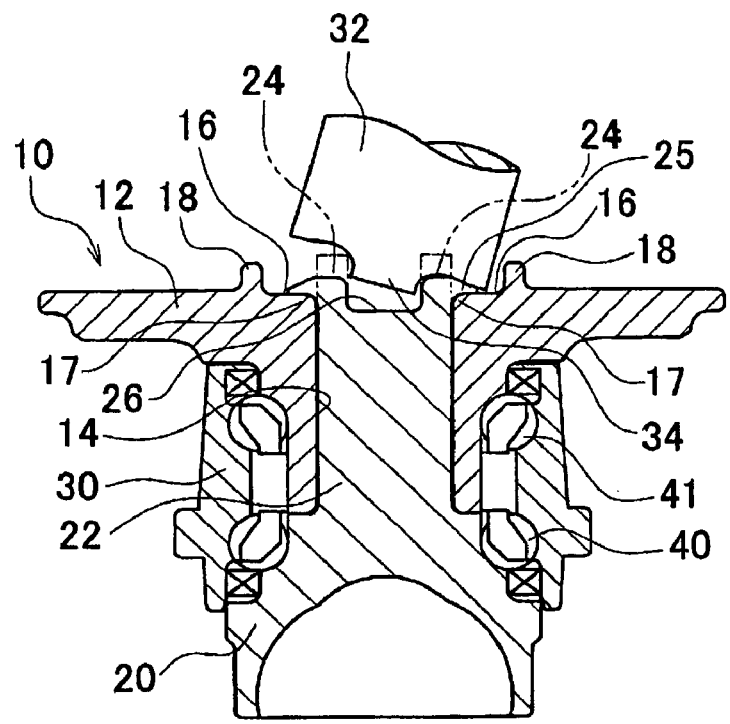
FIG. 1 is a diagram for describing a calking processing procedure in a first embodiment of the invention.

With reference to FIG. 1, a method in which calking processing is performed on a wheel bearing assembly 10 of a first embodiment of the invention will be described. It is to be noted herein that an upper side in FIG. 1 is a side at which a traveling wheel is attached, and a lower side in FIG. 1 is an inner side in the vehicle width direction. In the description below, the upper side in FIG. 1 (also in FIG. 2 and FIG. 3) is termed the outer side or the outward direction, and the lower side therein is termed the inner side or the inward direction. Referring to FIG. 1, prior to the calking processing in a wheel bearing assembly 10, a plurality of balls 40 as rolling elements are disposed on an inner ring raceway surface that is formed on an outer periphery of a constant-velocity joint outer ring 20, and then a ball bearing outer race 30 having a tubular shape is fitted onto the constant-velocity joint outer ring 20. Then, after a plurality of balls 41 as rolling elements are disposed on an outer race raceway surface that is formed on an inner peripheral surface of an opposite side portion (an upper side portion in FIG. 1) of the ball bearing outer race 30, a center shaft portion 22 that is formed in a solid cylindrical shape without an internal cavity or the like and that is formed integrally with a shaft center portion of the constant-velocity joint outer ring 20 is spline-fitted to a hollow hole 14 of a wheel hub 12. A tubular protrusion 24 is formed on an end portion of the center shaft portion 22 of the constant-velocity joint outer ring 20. On an inward side of the tubular protrusion 24, there is formed a guide hole 26 that can receive a cylindrical punch protrusion end 34 that is protruded from a distal end of a calk punch 32 that is a calk jig. Besides, a calk fixation portion 17 is located in an outer end surface 16 of the wheel hub 12, surrounding a peripheral edge of the hollow hole 14. Besides, an annular protrusion 18 having a tubular shape is formed on the outer end surface 16 of the wheel hub 12, surrounding the calk fixation portion 17 around the peripheral edge of the hollow hole 14. Incidentally, the calk fixation portion 17 is located between the hollow hole 14 and the annular protrusion 18, and is at a position that is the closest to the hollow hole 14. Then, the length of the annular protrusion 18 in the axis direction is set at such a length that the annular protrusion 18 does not interfere with the calk punch 32 during the oscillating turn of the calk punch 32.

The punch protrusion end 34 of the calk punch 32 is inserted into the guide hole 26 formed inside the tubular protrusion 24 of the center shaft portion 22 of the constant-velocity joint outer ring 20, and the calk punch 32 is oscillatingly turned while being pressed against the tubular protrusion 24, so that the tubular protrusion 24 is bent radially outward, and is calk-fixed to the calk fixation portion 17 of the outer end surface 16 of the wheel hub 12. Incidentally, at the time of the calking processing, the assembly of the constant-velocity joint outer ring 20 and the wheel hub 12 is placed on a table with a cup-shaped portion of the constant-velocity joint outer ring 20 facing downward, and the calk punch 32 is pressed against the end portion of the center shaft portion 22 when the calk punch 32 is oscillatingly turned. Therefore, there is a concern that force may act on the cup-shape portion of the constant-velocity joint outer ring 20, and may deform the constant-velocity joint outer ring 20. Therefore, in order to prevent the deformation of the constant-velocity joint outer ring 20 from being caused by the calking processing, it is preferable that restraint jigs be set on the constant-velocity joint outer ring 20 at the time of calking processing, by using the technology illustrated in FIG. 4 in the related literature 1.

As stated above, the axial length of the annular protrusion 18 formed around the outer periphery of the calk fixation portion 17 of the outer end surface 16 of the wheel hub 12 is set at such a length that the annular protrusion 18 does not interfere with the calk punch 32 when the calk punch 32 is oscillatingly turned. Hence, at the time of the calk fixation, the oscillation space for the calk punch 32 can be secured, and the interference of the calk punch 32 with the annular protrusion 18 of the wheel hub 12 can be prevented.

Figure 2:
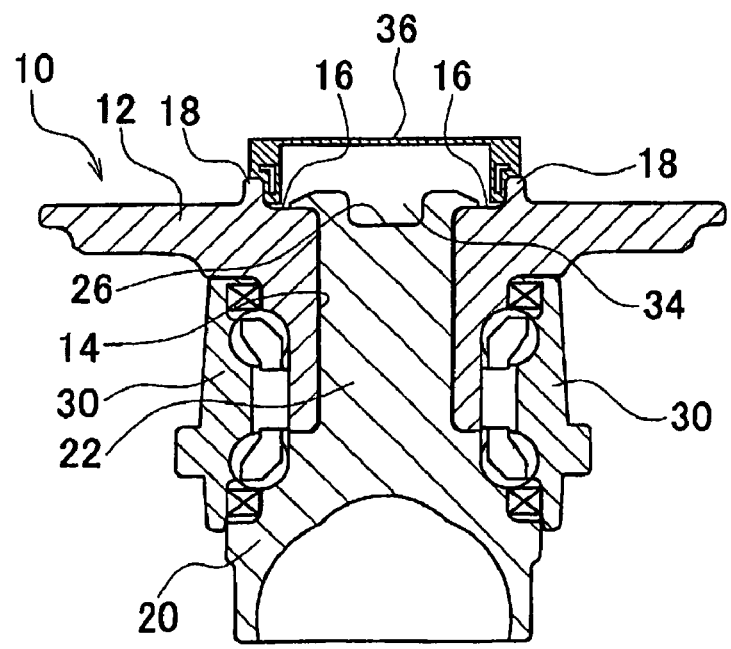
FIG. 2 is a diagram showing a state in which a cover is attached to a wheel bearing assembly in the first embodiment.

After the calking processing ends, the annular protrusion 18 of the wheel hub 12 is covered with a cover 36 that serves as a guide for guiding a traveling wheel member to the wheel hub 12. FIG. 2 shows a state in which the cover 36 is attached to the annular protrusion 18 of the wheel hub 12. The cover 36 attached to the annular protrusion 18 extends further outward (upward in FIG. 2) in the axis direction from the distal end of the annular protrusion 18. In this embodiment, the cover 36 used is made of resin, but the cover 36 may also be made of iron. Since the cover 36 is attached to the wheel bearing assembly 10, it is easy to attach a traveling wheel member to the wheel bearing assembly 10. Besides, the cover 36 prevents entrance of water from outside the wheel bearing assembly 10 into the wheel bearing assembly 10, and thus prevents formation of rust at the calked portion 25 or the spline fitting portion.

According to the first embodiment, since the interference of the calk punch 32 with the annular protrusion 18 of the wheel hub 12 is restrained, the degree of freedom in the design of the shaft and the like increases. For example, the diameter of the center shaft portion 22 formed integrally with the constant-velocity joint outer ring 20 can be increased, and the outside diameter of the calk can be increased. Besides, it becomes possible to reduce the diameter of the annular protrusion 18 of the wheel hub 12. In the foregoing embodiment, as for the center shaft portion formed integrally with the constant-velocity joint outer ring, a portion thereof that is spline-fitted (i.e., a portion thereof excluding tubular portions that are provided at the two opposite ends) is formed in a solid cylindrical shape. Therefore, there is no concern that the center shaft portion 22 may deform due to the stress that acts on the center shaft portion 22 of the constant-velocity joint outer ring 20 during the calking processing. Incidentally, if the center shaft portion 22 of the constant-velocity joint outer ring is formed so as to have a hollow tubular configuration, the wheel bearing assembly can be reduced in weight. In this case, in order to avoid deformation of the center shaft portion during the calking processing, it is preferable to set restraint jigs on the inside of the tubular center shaft portion when the calking processing is performed.

Figure 3:
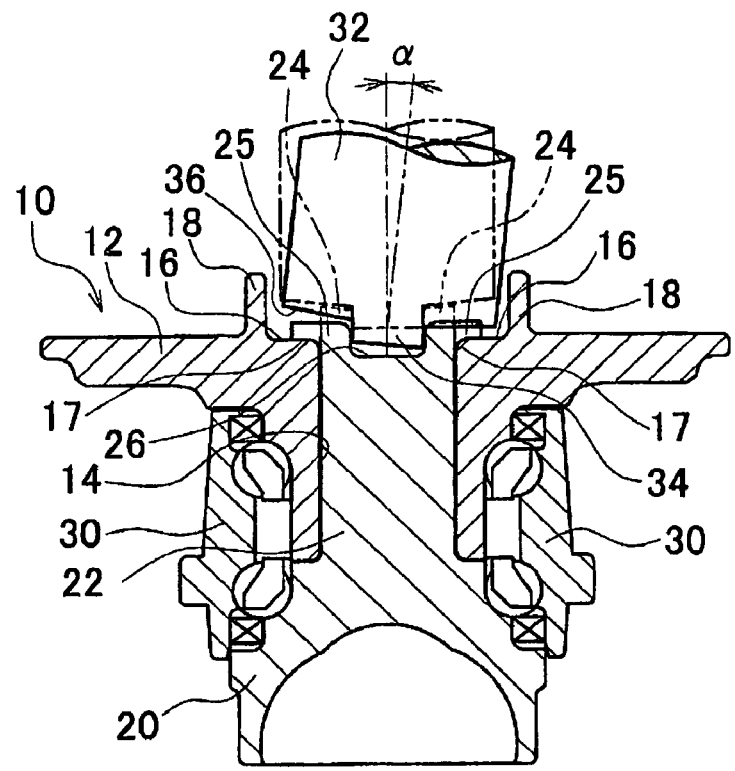
FIG. 3 shows a sectional view of a wheel bearing assembly in a second embodiment at the time of calking processing, which is taken on a plane parallel to an axis.

FIG. 3 shows a sectional view of a wheel bearing assembly 10 of a second embodiment of the invention during the calking processing, which is taken on a plane parallel to the axis. With reference to FIG. 3, a method of performing the calking processing on the wheel bearing assembly 10 will be described. In the wheel bearing assembly 10, prior to the calking processing, a center shaft portion 22 formed integrally with a constant-velocity joint outer ring 20 is spline-fitted into a hollow hole 14 of a wheel hub 12, and an outer race 30 of a multi-row rolling bearing is fitted onto and therefore is integrated with the constant-velocity joint outer ring 20 and the wheel hub 12 that are connected together. A tubular protrusion 24 is formed on an end portion of the center shaft portion 22 of the constant-velocity joint outer ring 20. Inside the tubular protrusion 24, a guide hole 26 that guides a calk jig is formed.

Figure 4:
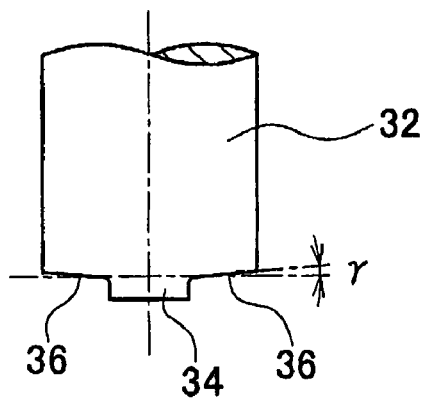
FIG. 4 is an external view of a calk jig in the second embodiment, which is parallel to an axis of the jig.

FIG. 4 shows an external view of a calk punch 32 that is a calk jig used for the calking processing of the wheel bearing assembly 10, which is parallel to the axis. The calk punch 32 has a cylindrical shape that is rotationally symmetric. A punch protrusion end 34 having a solid cylindrical configuration is protruded from a central portion of a distal end of the calk punch 32. The diameter of the punch protrusion end 34 is smaller than the inside diameter of the guide hole 26 so that the punch protrusion end 34 can be inserted into the guide hole 26 that is formed inside the tubular protrusion 24 of the constant-velocity joint outer ring 20. Then, around the punch protrusion end 34, there is formed a conical pressing surface 36 that is inclined upward at an angle of 3 degrees with respect to a reference plane (shown by a dashed one-dotted line in FIG. 4) that intersects at right angle with a center axis of the calk punch 32 at a proximal end of the punch protrusion end 34. That is, it can be said that the pressing surface of the calk punch 32 is an inclined plane that is inclined radially outward from the punch protrusion end 34, and that the angle formed between the inclined plane and the punch protrusion end 34 is set at an obtuse angle. In other words, it can be said that the planar pressing surface 36 has such a shape that as a point on the planar pressing surface 36 moves from the radially outermost end of the surface closer to the proximal end of the punch protrusion end 34, the point gradually approaches the reference plane, and that the planar pressing surface 36 is inclined so that the angle γ formed between the reference plane and the pressing surface 36 is 3 degrees. As shown in FIG. 3, a tubular annular protrusion 18 is formed at a radially outward side of a calk fixation portion 17 that is located around a peripheral edge of the hollow hole 14 in an outer end surface 16 of the wheel hub 12.

The calking processing operation is performed as follows. Firstly, as shown by an imaginary line in FIG. 3, the punch protrusion end 34 of the calk punch 32 is inserted into the guide hole 26, and the pressing surface 36 of the calk punch 32 is pressed against the tubular protrusion 24. Next, the pressing surface 36 of the calk punch 32 pressed against the tubular protrusion 24, and the calk punch 32 is oscillated, so as to bend the tubular protrusion 24 radially outward. Then, the calked portion 25 formed by bending the tubular protrusion 24 radially outward is calked and fixed to the calk fixation portion 17 of the outer end surface 16 of the wheel hub 12. The oscillation angle α through which the center axis of the calk punch 32 is oscillatingly turned is less than or equal to 5 degrees with respect to the center axis of the center shaft portion 22 of the constant-velocity joint outer ring 20. In this embodiment, the oscillation angle at of the calk punch 32 is 3 degrees at maximum.

Figure 5:
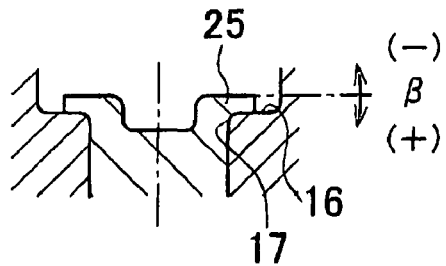
FIG. 5 is a sectional view of a calked portion in the second embodiment, which is taken on a plane parallel to an axis.
Figure 6:
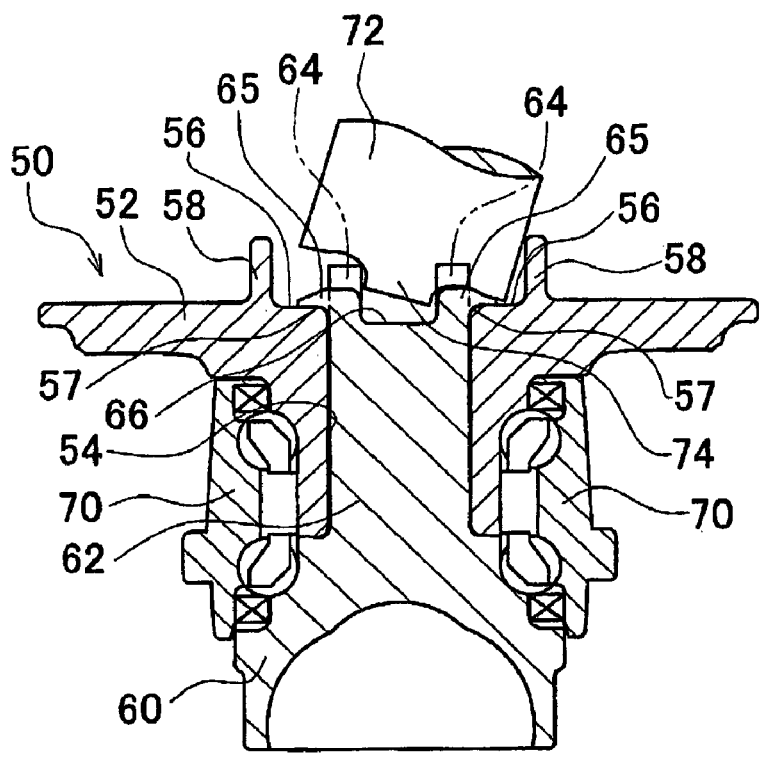
FIG. 6 is a sectional view of a related-art wheel bearing assembly at the time of calking processing.

FIG. 5 shows a sectional view of the calked portion 25 of the wheel bearing assembly 10 after the calking processing, which is taken on a plane parallel to the axis. The maximum oscillation angle α of the calking processing is 3 degrees, and the inclination angle of the pressing surface 36 is also 3 degrees. Therefore, the outer surface of the calked portion 25 has a flat surface shape that is perpendicular to the center axis of the center shaft portion 22.

Figure 7:
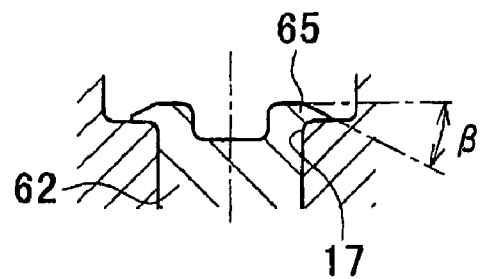
FIG. 7 is a sectional view of a related-art calked portion, which is taken on a plane parallel to an axis.

According to the second embodiment, the calked portion 25 has a planar shape, and the calking angle β is 0 degree, which is therefore smaller than the calking angle according to the related art shown in FIG. 7. Therefore, the angle of the oscillating turn of the calk jig can be set smaller than in the related art. Therefore, the oscillation space needed for the calk punch 32 is relatively small, so that the interference of the calk punch 32 with the annular protrusion 18 of the wheel hub 12 can be prevented even when the position of the annular protrusion 18 of the wheel hub 12 and the length thereof in the outward direction are the same as in the related art shown in FIG. 7. Besides, since the force needed for the calking is smaller than in the related art, impressions on surfaces are unlikely to occur, and deformation of the wheel hub 12 or the constant-velocity joint outer ring 20 is also unlikely to occur. Incidentally, at the time of the calking processing, deformation of the cup-shape portion of the constant-velocity joint outer ring 20 is restrained by setting restraint jigs on the cup-shape portion of the constant-velocity joint outer ring 20 according to need.

Besides, according to the second embodiment, since the pressing surface 36 positioned around the punch protrusion end 34 of the calk punch 32 has a planar shape that is formed by connecting straight lines of a fixed inclination which extends radially outward from the center axis of the calk punch 32, the configuration of the calk punch 32 becomes simple. Besides, since the contact of the calk punch 32 with the tubular protrusion 24 that is positioned on the end portion of the center shaft portion 22 of the constant-velocity joint outer ring 20 is a planar contact, the calked portion 25 does not fit into the calk punch 32, so that good operation efficiency of the calking is achieved. Besides, since the oscillation angle α through which the center axis of the calk punch 32 is oscillatingly turned is less than or equal to 5 degrees (e.g., 3 degrees at maximum) with respect to the center axis of the center shaft portion 22 of the constant-velocity joint outer ring 20, the oscillation space for the calk punch 32 can be made smaller than in the related art. Hence, even if the position of the annular protrusion 18 of the wheel hub 12 and the length thereof in the outward direction are the same as in the related art, the interference of the calk punch 32 with the annular protrusion 18 of the wheel hub 12 can be prevented.

Besides, according to the second embodiment, since the interference of the calk punch 32 with the annular protrusion 18 of the wheel hub 12 is restrained, the degree of freedom in the design of the shaft or the like increases. For example, the diameter of the center shaft portion 22 formed integrally with the constant-velocity joint outer ring 20 can be increased, and the outside diameter of the calk can be increased, and so on.

In the second embodiment, the outer surface of the calked portion 25 has a planar shape perpendicular to the center axis of the center shaft portion 22, and the calking angle is 0 degree. However, the range of −5 degrees to 15 degree is a preferable range of the calking angle. In the case where the calking angle is less than −5 degrees, the strength of the calking for restraining the loosening of between the wheel hub 12 and the constant-velocity joint outer ring 20 in the axis direction is not sufficient. Besides, if the calking angle exceeds 15 degrees, the strength of the calking is sufficient, but the oscillation space for the calk punch 32 does not become favorably small. Therefore, such a large calking angle is not good to secure a degree of freedom in the design of the shaft or the like: for example, an allowance for increasing the diameter of the center shape portion 22 formed integrally with the constant-velocity joint outer ring 20; an allowance for increasing the diameter of the calk; etc. Hence, a preferable range of the calking angle is −5 to 15 degrees.

Although in the second embodiment, the oscillation angle α is 3 degrees, a preferable range of the oscillation angle α is less than or equal to 5 degrees. If the oscillation angle is less than or equal to 5 degrees, a good strength of the calking for restraining the loosening between the wheel hub 12 and the constant-velocity joint outer ring 20 in the axis direction can be secured. On another hand, if the oscillation angle α exceeds 5 degrees, and enters a range of about 7 to 8 degrees, it becomes impossible to secure a sufficient degree of freedom in the design of the shaft or the like: for example, an allowance for increasing the diameter of the center shaft portion 22 formed integrally with the constant-velocity joint outer ring 20; an allowance for increasing the outside diameter of the calk; etc. Hence, a preferable range of the oscillation angle α is less than or equal to 5 degrees. Incidentally, if the oscillation angle α is 0 degree and the calking is carried out by pressing the calk jig down without oscillating it, a good strength of the calking for restraining the loosening between the wheel hub 12 and the constant-velocity joint outer ring 20 in the axis direction can be secured.

Although in the second embodiment, both the oscillation angle α of the calk punch 32 and the inclination of the pressing surface 36 of the calk punch 32 are 3 degrees, the oscillation angle α and the inclination do not need to be equal. Besides, the shape of the pressing surface 36 is not limited by the second embodiment, either. The invention can be carried out in various forms within the scope of the idea of the invention.

What is claimed is:

1. A wheel bearing assembly, comprising:
a wheel hub having a hollow hole formed in a shaft center portion, an annular protrusion provided on an outer end surface, and a calk fixation portion of the outer end surface which is located between the hollow hole and the annular protrusion; and
a constant-velocity joint outer ring having a center shaft portion, and a tubular protrusion formed on an end portion of the center shaft portion,
wherein a length of the annular protrusion in an axis direction, or an oscillation angle through which a center axis of a calk jig is oscillatingly turned relative to a center axis of the constant-velocity joint outer ring, is restricted so that the annular protrusion and the calk jig do not interfere with each other when the constant-velocity joint outer ring is calk-fixed to the calk fixation portion of the wheel hub by bending the tubular protrusion radially outward through oscillating turn of the calk jig after the center shaft portion of the constant-velocity joint outer ring has been fitted to the hollow hole of the wheel hub,
wherein a fitting between the hollow hole of the wheel hub and the center shaft portion of the constant-velocity joint outer ring comprises a spline fitting,
wherein an outer surface of a calked portion is formed by bending the tubular protrusion of the constant-velocity joint outer ring,
wherein the outer surface has a construction in which an inclination angle of the outer surface toward an inner side with respect to a direction radially outward from the center axis of the center shaft portion in a plane that is substantially perpendicular to the center axis, and
wherein and the inclination angle is in a range of −5 degrees to 15 degrees.

2. The wheel bearing assembly according to claim 1, wherein the length of the annular protrusion of the wheel hub in the axis direction is set at such a length that the annular protrusion does not interfere with the calk jig when the calk jig is oscillatingly turned.

3. The wheel bearing assembly according to claim 1, wherein
a portion of the center shaft portion of the constant-velocity joint outer ring, that is spline-fitted, is formed in a solid cylindrical shape.

4. The wheel bearing assembly according to claim 2, further comprising a cover that is attached to the annular protrusion of the wheel hub and that therefore serves as a guide for guiding a traveling wheel member to the wheel hub, the cover extending further outward in the axis direction from a distal end of the annular protrusion when the cover is attached to the annular protrusion.

5. The wheel bearing assembly according to claim 1, wherein the outer surface of the calked portion includes only a flat surface that is perpendicular to the center axis of the center shaft portion.

6. The wheel bearing assembly according to claim 1, wherein the oscillation angle through which the center axis of the calk jig is oscillatingly turned is less than or equal to 5 degrees relative to the center axis of the center shaft portion of the constant-velocity joint outer ring.

7. A calk jig for a wheel bearing assembly, comprising:
a cylindrical calk punch;
a punch protrusion end provided on a central portion of a distal end of the calk punch; and
a pressing surface that is located around the punch protrusion end, and that comprises only a flat surface that forms an obtuse angle with a central axis of the calk punch,
wherein the pressing surface of the calk jig comprises an inclined flat surface that is inclined radially outward from the punch protrusion end, and an angle formed by the inclined flat surface and the punch protrusion end is set at an obtuse angle.

* * * * *